(12) United States Patent
Britten-Austin et al.

(10) Patent No.: US 7,584,038 B2
(45) Date of Patent: Sep. 1, 2009

(54) METHOD AND APPARATUS FOR DETERMINING VIRTUAL VISIBILITY

(75) Inventors: Robert Neil Britten-Austin, Cary, NC (US); John Sanderson, Milton Keynes (GB)

(73) Assignee: Caterpillar Inc., Peoria, IL (US)

( * ) Notice: Subject to any disclaimer, the term of this patent is extended or adjusted under 35 U.S.C. 154(b) by 624 days.

(21) Appl. No.: 11/192,286

(22) Filed: Jul. 29, 2005

(65) Prior Publication Data

US 2007/0027659 A1 Feb. 1, 2007

(51) Int. Cl.
G06G 7/48 (2006.01)
(52) U.S. Cl. ................... 701/50; 703/7; 703/8
(58) Field of Classification Search ........... 701/50, 701/23, 209, 26; 703/6, 8; 56/10.2 A, 10.2 F, 56/10.2
See application file for complete search history.

(56) References Cited

U.S. PATENT DOCUMENTS

| | | | |
|---|---|---|---|
| 3,746,778 A | 7/1973 | Peters | |
| 4,641,255 A | 2/1987 | Hohmann | |
| 5,590,268 A * | 12/1996 | Doi et al. | 715/848 |
| 5,684,496 A | 11/1997 | Parus | |
| 5,952,993 A | 9/1999 | Matsuda et al. | |
| 6,110,216 A * | 8/2000 | Weber et al. | 703/8 |
| 6,113,643 A * | 9/2000 | Weber et al. | 703/8 |
| 6,124,862 A | 9/2000 | Boyken et al. | |
| 6,205,367 B1 | 3/2001 | Arita et al. | |
| 7,295,959 B2 * | 11/2007 | Noma et al. | 703/8 |
| 2004/0107077 A1 | 6/2004 | Sinha et al. | |
| 2005/0046953 A1 | 3/2005 | Repetto et al. | |

FOREIGN PATENT DOCUMENTS

JP 2004-164337 6/2004

* cited by examiner

*Primary Examiner*—Khoi Tran
*Assistant Examiner*—Spencer Patton
(74) *Attorney, Agent, or Firm*—Finnegan, Henderson, Farabow, Garrett & Dunner

(57) ABSTRACT

A method for determining virtual visibility is disclosed. The method includes modeling at least one object in a virtual space and plotting at least one surface from a first predetermined location relative to the at least one object within the virtual space. The method further includes identifying at least one interference between the at least one object and the at least one surface. The method still further includes determining a first characteristic of the at least one interference and determining if the first characteristic is within a predetermined range.

20 Claims, 5 Drawing Sheets

METHOD AND APPARATUS FOR DETERMINING VIRTUAL VISIBILITY

TECHNICAL FIELD

The present disclosure relates generally to a method and apparatus for determining visibility, and more particularly, to a method and apparatus for determining virtual visibility.

BACKGROUND

Users of devices and/or structures normally have, at least to some degree, sight paths from a given perspective relative to the device and/or structure to a target perimeter. These sight paths usually include visibility limits and/or obstructions often caused by structural portions of the devices and/or structures located between the given perspective and the target perimeter. The given perspectives are typically an operational control center from which the device may used and/or operated. The target perimeters are typically a circular or other arcuate perspective above, below, at the horizon, and/or any other desired perimeter and may include less than or equal to 360°. The limits and/or obstructions may cause interferences on the target perspective creating areas unviewable by a user. Although such interferences may significantly diminish the visibility of the target perimeter, the limits and/or obstructions may be necessary to protect the user.

The degree of interference on a target perimeter may also adversely affect the safety, operability, and/or use of an object. For example, obstructions within a line of sight may affect the operational safety of a vehicle by creating visual blind spots for an operator manipulating a vehicle. Because of the blind spots, an operator may be unaware of objects, such as, for example, other vehicles, persons, and/or physical objects and may not adjust operation of the vehicle accordingly. For another example, obstructions within a line of sight may impair the visibility of a spectator viewing a performed event. Because of obstructions, the spectator may not be able to view all aspects of the event and thus may not fully appreciate the event.

One method of determining a degree of visibility is disclosed in U.S. Pat. No. 6,205,367 B1 ("the '367 patent") to Arita et al. The '367 patent discloses an apparatus for supporting equipment operability evaluation. The apparatus uploads equipment models, uploads user models, and determines visibility from the user model to the equipment model. Specifically, the '367 patent discloses a simulation space in which models of equipment and body shaped models are arranged. Different body shaped models may be uploaded into the simulation space to analyze the equipment with respect to the different body shaped models. The '367 patent also discloses a visibility determination component which determines whether an object in the simulation space is visible for a particular body shaped model. Although the '367 patent may determine if an object is visible, it requires the importing and exporting of model files which may be cumbersome, time consuming, and may distort the accuracy of the model relative to actual geometries. Additionally, the '367 patent determines visibility to a selected object, thus requiring numerous determinations in order to identify interferences within an entire sight path.

The disclosed system is directed to overcoming one or more of the problems set forth above.

SUMMARY OF THE INVENTION

In one aspect, the present disclosure is directed to a method of determining interferences. The method includes modeling at least one object in a virtual space and plotting at least one surface from a first predetermined location relative to the at least one object within the virtual space. The method further includes identifying at least one interference between the at least one object and the at least one surface. The method still further includes determining a first characteristic of the at least one interference and determining if the first characteristic is within a predetermined range.

In another aspect, the present disclosure is directed to a design environment including a computer, a virtual design space, and a computer executable program. The computer executable program is capable of modeling an object at least partially based on user inputs and projecting a surface through the model within the virtual space. The computer executable program is also capable of identifying in the virtual space at least one intersection between the model and the surface.

In yet another aspect, the present disclosure is direct to a method of determining virtual visibility. The method includes generating a model within a virtual three-dimensional space being indicative of a first object. The method also includes generating a surface within the virtual three-dimensional space being indicative of visibility from a given perspective and identifying sections of the model intersecting the surface. The method further includes approximating portions of the object blocking visibility from the given perspective to a perimeter at least partially based on the sections.

DETAILED DESCRIPTION

Figure 1:
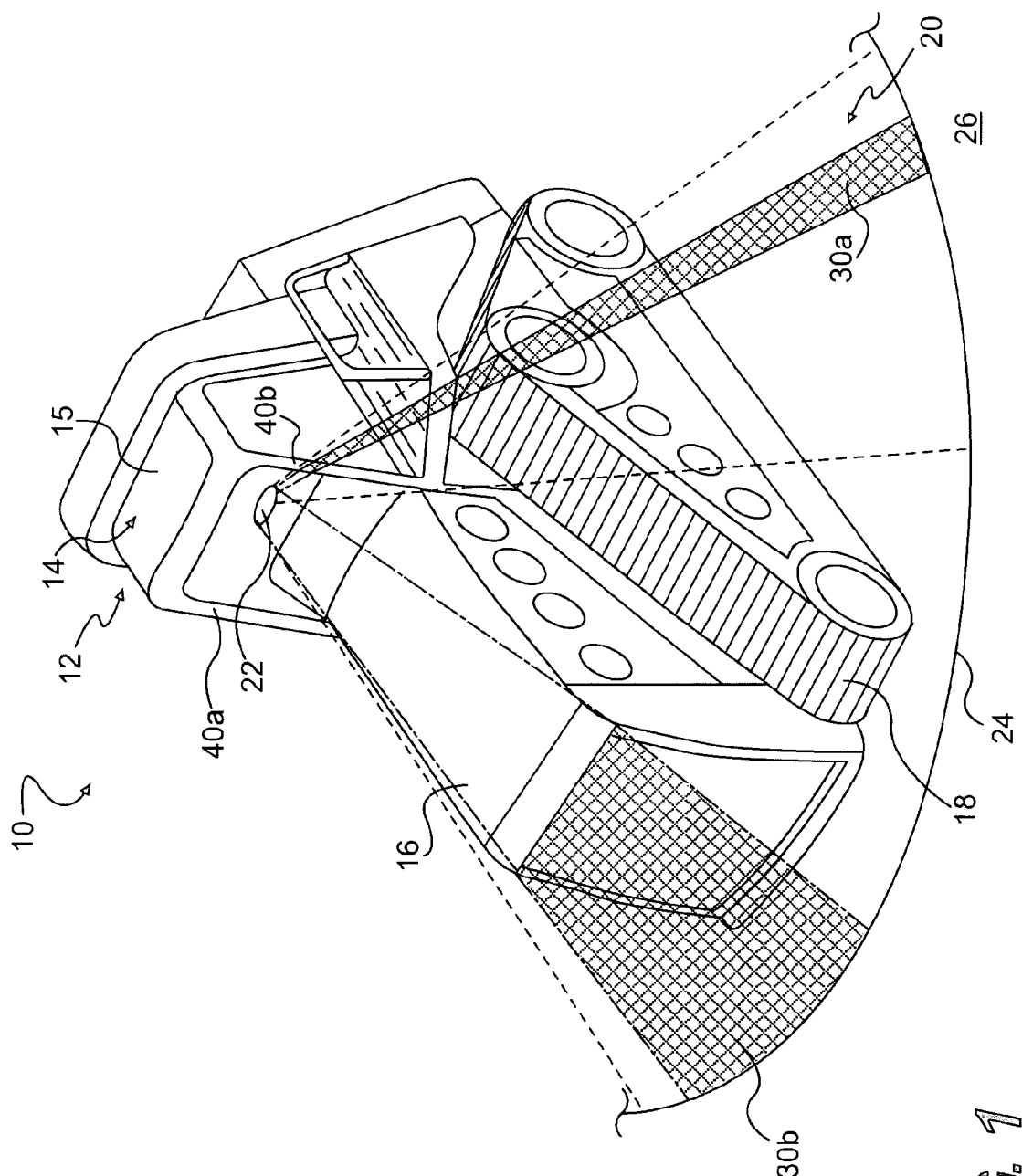
FIG. 1 is a schematic illustration of an object according to an exemplary disclosed embodiment.

FIG. 1 illustrates an exemplary object embodied as a work machine 10. Work machine 10 may include an operator station 12, a canopy 14, a frame 16, and/or other components known in the art. As an alternative to work machine 10, the object may embody any three dimensional object including, for example, a vehicle, a building, a sports facility, and/or other objects known in the art. It is contemplated that the object may be an existing object and/or a conceptual object. While the following disclosure will make reference to work machine 10 for clarification purposes, it is understood that the following aspects would be applicable to a wide variety of other objects.

Operator station 12 may include a command position from which an operator may operate work machine 10 via controls, such as, for example, levers, joysticks, switches, and/or other controllers known in the art. Operator station 12 may be configured to allow an operator to sit and/or stand and may be located at any desired position relative to work machine 10.

Canopy 14 may include a roof 15, support bars 40a-b and/or additional components, such as, for example, windows, doors, and/or mesh screening. Canopy 14 may be connected to frame 16 and may be configured to shield, protect, and/or guard the operator from hazards associated with work machine 10, such as, for example, airborne contaminants, falling debris, projectiles, weather, and/or other hazards. It is contemplated that canopy 14 may, alternatively, be omitted, if desired.

Frame 16 may include structural components that support work machine 10. Frame 16 may, for example, embody a stationary base frame supporting operator station 12, canopy 14, a ground support device 18, and/or other components of work machine 10. Frame 16 may alternatively include a movable frame member of a linkage system, a fixed structural support member, and/or any other type of frame element known in the art. It is contemplated that ground support device 18 may include traction devices, such as, for example tracks or wheels. It is contemplated that if the object alternatively embodies a stationary device, ground support device 18 may include fixed structural supports, such as, for example, footers or columns, and/or other devices known in the art.

A sight path 20 may develop from a predetermined location 22 relative to work machine 10 to a perimeter 24. It is noted and understood that a perimeter may include any shape and may span any length about work machine 10, e.g., a perimeter may completely surround work machine 10 (360°) or may span less than completely around work machine 10 (<360°). For example, sight path 20 may approximate the visibility of the operator from a given perspective within operator station 12 to the ground 26 and/or to any other visibility horizon. Sight path 20 may include sections 30a-b which are unviewable by the operator due to interferences cause by support 40b and frame 16 respectively. It is contemplated that there may be any number of sections that are unviewable by the operator because of any number of interferences located within sight path 20. It is further contemplated that interferences may be caused by other structural components of canopy 14, such as guard bars (not shown), components of work machine 10, such as railings (not referenced) or work implements (not shown), and/or other objects which may be disposed between an operator and a given visibility horizon. It is noted that sight path 20 is illustrated in FIG. 1 as being less than 360° for clarification purposes only and sight path 20 may include any number of degrees. It is also noted that the projection of sight path 20 from inside operator station 12 to ground 26 is for clarification purposes only and sight path 20 may project from any predetermined location relative to work machine 10 to be below, in-line, and/or above the predetermined location.

Figure 2:
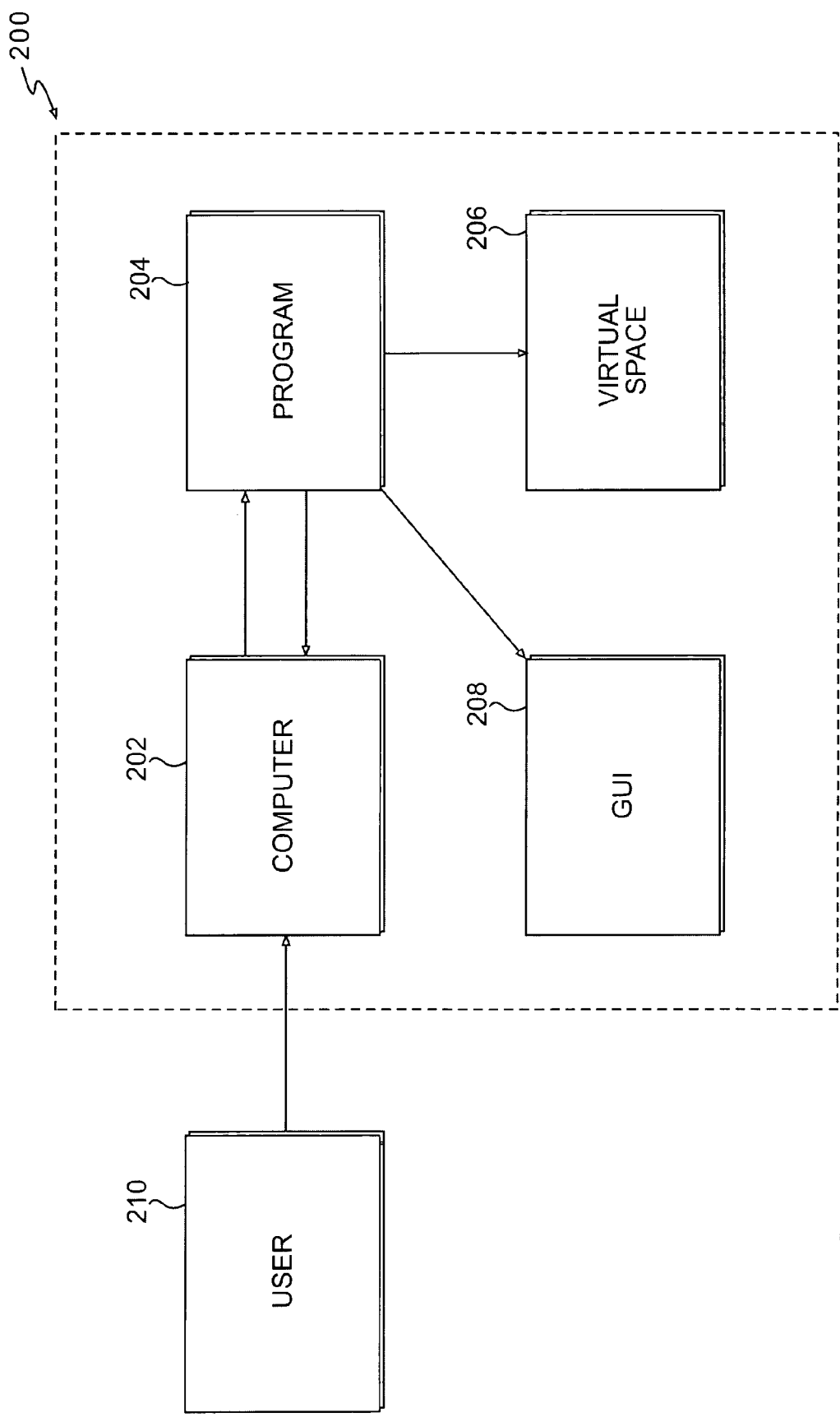
FIG. 2 is a schematic illustration of a design environment for modeling the object of FIG. 1.

FIG. 2 schematically illustrates an exemplary design environment 200. Design environment 200 may include a computer 202, a program 204, a virtual space 206, and a graphical user interface ("GUI") 208. Design environment 200 may be configured to accept inputs from a user 210 via computer 202 to construct a three-dimensional model within virtual space 206. Design environment 200 may be further configured to display the three dimensional model in GUI 208. It is contemplated that design environment 200 may include additional components such as, for example, a communications interface (not shown), a memory (not shown), databases (not shown), and/or other components known in the art.

Computer 202 may include a general purpose computer configured to operate executable computer code. Computer 202 may include one or more input devices, such as, for example, a keyboard (not shown) or a mouse (not shown) to introduce user inputs into computer 202. Computer 202 may also include one or more data manipulation devices, such as, for example, databases (not shown) or software programs (not shown) to transfer and/or alter user inputs. Computer 202 may also include one or more communication devices, such as, for example, a modem (not shown) or a network link (not shown) to communicate inputs and/or outputs with program 204. It is contemplated that computer 202 may further include additional and/or different components, such as, for example, a memory (not shown), a communications hub (not shown), a data storage (not shown), a printer (not shown), an audio-video device (not shown), removable data storage devices (not shown), or other components known in the art. It is also contemplated that computer 202 may communicate with program 204 via, for example, a local area network ("LAN"), a hardwired connection, and/or the Internet.

Figure 4:
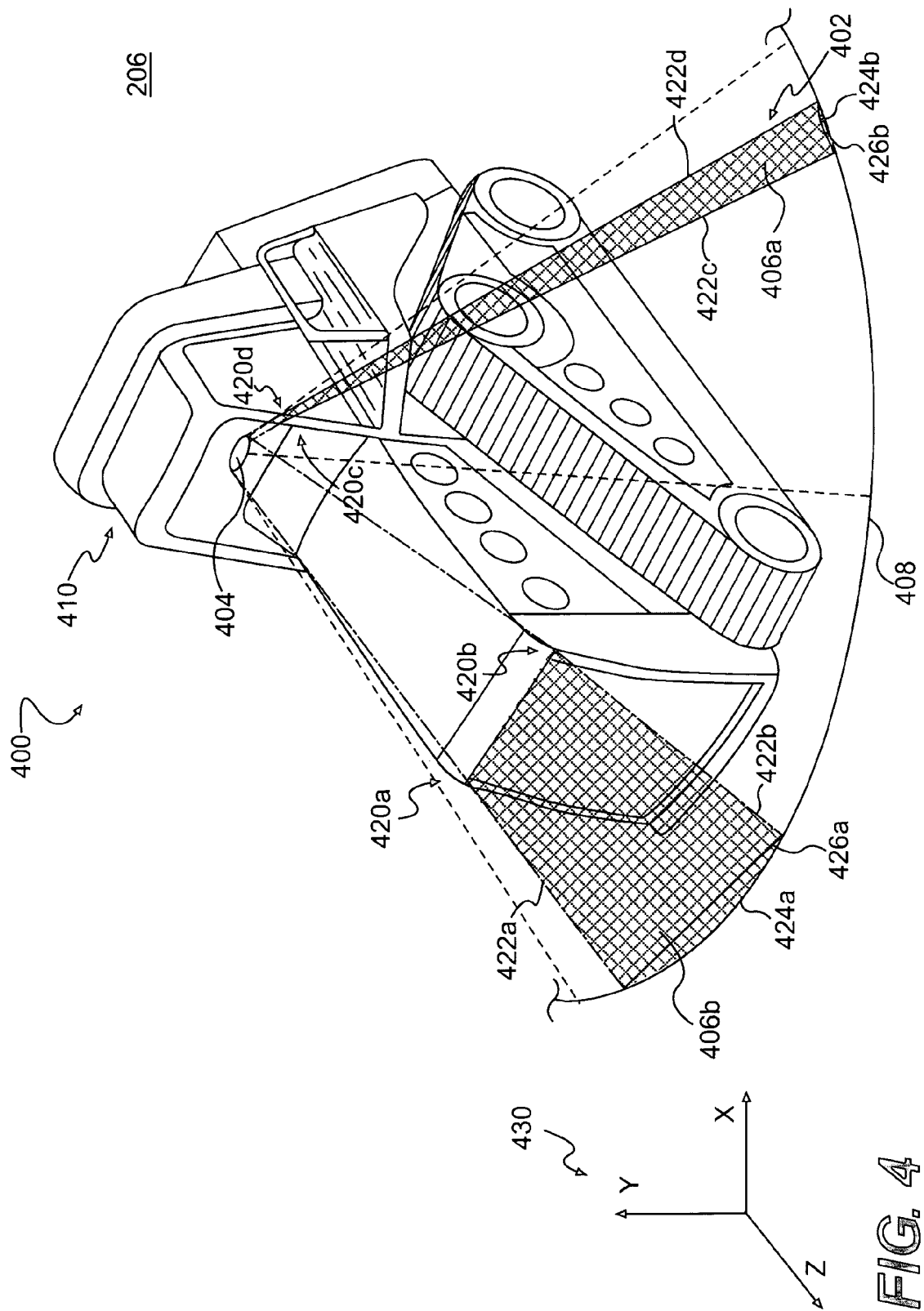
FIG. 4 is a schematic illustration of a model of the object of FIG. 1 within the design environment of FIG. 2.

Program 204 may include a computer executable code routine configured to perform one or more sub-routines and/or algorithms to generate a virtual three-dimensional modeled object 400 (see FIG. 4). As shown in FIG. 4, the virtual three-dimensional modeled object 400 may include, for example, a model of work machine 10 and a virtual surface 402, such as, for example a virtual representation of sight path 20. Referring again to FIG. 2, program 204 may further be configured to communicate with virtual space 206 and/or GUI 208 to display and/or manipulate the modeled object 400 and/or virtual surface 402. It is contemplated that program 204 may be stored within the memory (not shown) of computer 202 and/or stored on a remote server (not shown) accessible by computer 202. It is also contemplated that program 204 may alternatively and/or concurrently be configured to generate virtual two-dimensional models. It is further contemplated that program 204 may include additional sub-routines and/or algorithms to perform various other operations with respect to the three-dimensional model, generate or import additional models into program 204, and/or perform other computer executable operations.

Virtual space 206 may include a virtual three-dimensional space at least partially based on a three-dimensional coordinate system 430. Three dimensional coordinate system 430 may be Cartesian (as illustrated, see FIG. 4), Cylindrical (not shown), and/or Spherical (not shown). Virtual space 206 may be configured to represent a plurality of points, lines, surfaces, and/or volumes therein based in part on commands received from program 204. Virtual space 206 may include a reference location (not shown) to which all points, lines, surfaces, and/or volumes may be referenced and/or arranged to facilitate the generation of modeled object 400. It is contemplated that the reference location may embody an origin of coordinate system 430 and/or another reference point within virtual space 206. It is further contemplated that virtual space 206 may represent volumes as wire-frames, surfaces by their respective edges, and lines by their respective endpoints as is known in the art.

GUI 208 may be configured to interact with program 204 to visually display relationships of data to user 210. Specifically, GUI 208 may be configured to display the relationships of the plurality of points, lines, surfaces, and/or volumes relative to the reference point to visually show modeled object 400. It is contemplated that GUI 208 may display a plurality of colors, shading, and/or patterns to distinguish and/or visually identify different parts of modeled object 400. It is further contemplated that GUI may be configured to display various perspectives of modeled object 400 from various view points.

Figure 3:
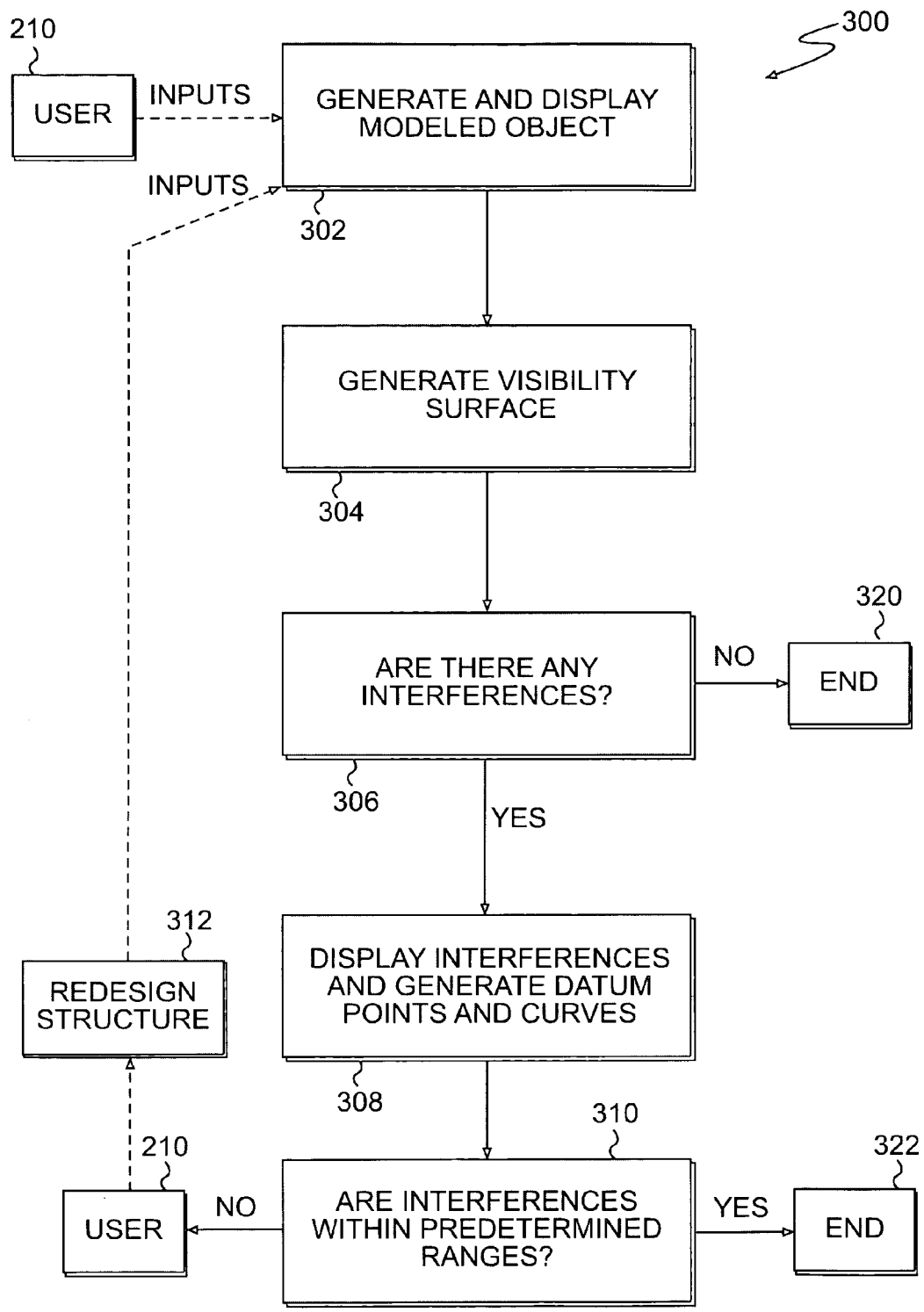
FIG. 3 is a flow chart of a method to model the object of FIG. 1 within the design environment of FIG. 2.

FIG. 3 illustrates an exemplary method 300 which may include various stages to determine a virtual visibility from a given perspective. Referring to FIGS. 3 and 4, method 300 may include generating modeled object 400 in virtual space 206 and displaying modeled object 400 in GUI 208 (step 302). Method 300 may also include generating virtual surface 402 within virtual space 206 from a predetermined location 404 relative to modeled object 400 (step 304). Method 300 may also include determining interferences 406a-b between modeled object 400 and virtual surface 402 (step 306). Method 300 may also include displaying interferences 406a-

*b*, if any, within GUI 208 (step 308). Method 300 may further include comparing interferences 406*a-b*, if any, with predetermined acceptable ranges of interferences 406*a-b* (step 310). User 210 may, if desired, redesign modeled object 400 (step 312). Method 300 may be configured to end if no interferences 406*a-b* are determined (step 320), and may further be configured to end if interferences 406 *a-b* are within the predetermined ranges of acceptable interferences (step 322). It is contemplated that method 300 may be repeated for any number of iterations for new and re-designed models of the object, as desired, regardless of the determined interferences.

Step 302 may include user 210 delivering inputs to program 204 via computer 202 to generate modeled object 400, representative of, for example, work machine 10. Program 204 may accept inputs from user 210 and perform one or more sub-routines and/or algorithms to generate modeled object 400 within virtual space 206. It is contemplated that the inputs may be delivered, for example, by computer 202 to program 204 by an input/output interface or other computer communication interface known in the art.

Step 304 may include generating virtual surface 402 at least partially based on inputs from user 210. Program 204 may be configured to generate virtual surface 402 from predetermined location 404 to a virtual perimeter 408 disposed around modeled object 400. For example, program 204 may generate virtual surface 402 from within a virtual operator station 410 so as to approximate site path 20 (see FIG. 1). Specifically, program 204 may generate virtual surface 402 having a conical-like shape, and more particularly having a frustum-like shape, wherein predetermined location 404 may be modeled as a first circle, virtual perimeter 408 may be modeled as a second circle, and virtual surface 402 may be defined between the first circle and the second circle. Step 304 may further include program 204 projecting virtual surface 402 through modeled object 400 as is known in the art of virtual modeling. It is contemplated that virtual surface 402 may be any desired shape, such as, for example, pyramidal, tetrahedral, and/or other shapes. It is further contemplated that predetermined location 404 and/or virtual perimeter 408 may be any desired shape, such as, for example, elliptical, rectangular, any other shape, and/or a single point.

Step 306 may include determining interferences 406*a-b* between modeled object 400 and virtual surface 402. Specifically, program 204 may be configured to determine intersections 420*a-d* between modeled object 400 and virtual surface 402. It is contemplated that program 204 may determine intersections 420*a-d* via a predetermined algorithm identifying in virtual space 206 a coincident and/or overlapping data point and/or points of modeled object 400 and virtual surface 402.

Step 308 may include displaying interferences 406*a-b*, if any, and generating datum points (not shown) at intersections 420*a-d*. Specifically, program 204 may be further configured to section virtual surface 402 at intersections 420*a-d* and color and/or shade interferences 406*a-b*. Additionally, program 204 may generate the datum points at intersections 420*a-d*. It is contemplated that the datum points may be displayed in GUI as distinct from both modeled object 400 and virtual surface 402.

Step 308 may further include generating datum curves 422*a-d* through the datum points. Datum curves 422*a-d* may be tangent to predetermined location 404 and extend to virtual perimeter 408. Specifically, datum curves 422*a-d* may be generated to establish a minimum degree of unviewable area. Datum curves 422*a-b* and 422*c-d* may be generated to minimize the length of chords 426*a* and 426*b*, respectively. For example, it is understood that a plurality of datum curves could be generated through a given datum point, tangent to predetermined location 404, and extended to virtual perimeter 408. However, two of the plurality of datum curves can be selected to minimize the length of a resultant chord. It is contemplated that two or more of the datum curves may overlap one another along perimeter 408 establishing no unviewable area along perimeter 408 for a given interference.

Figure 5:
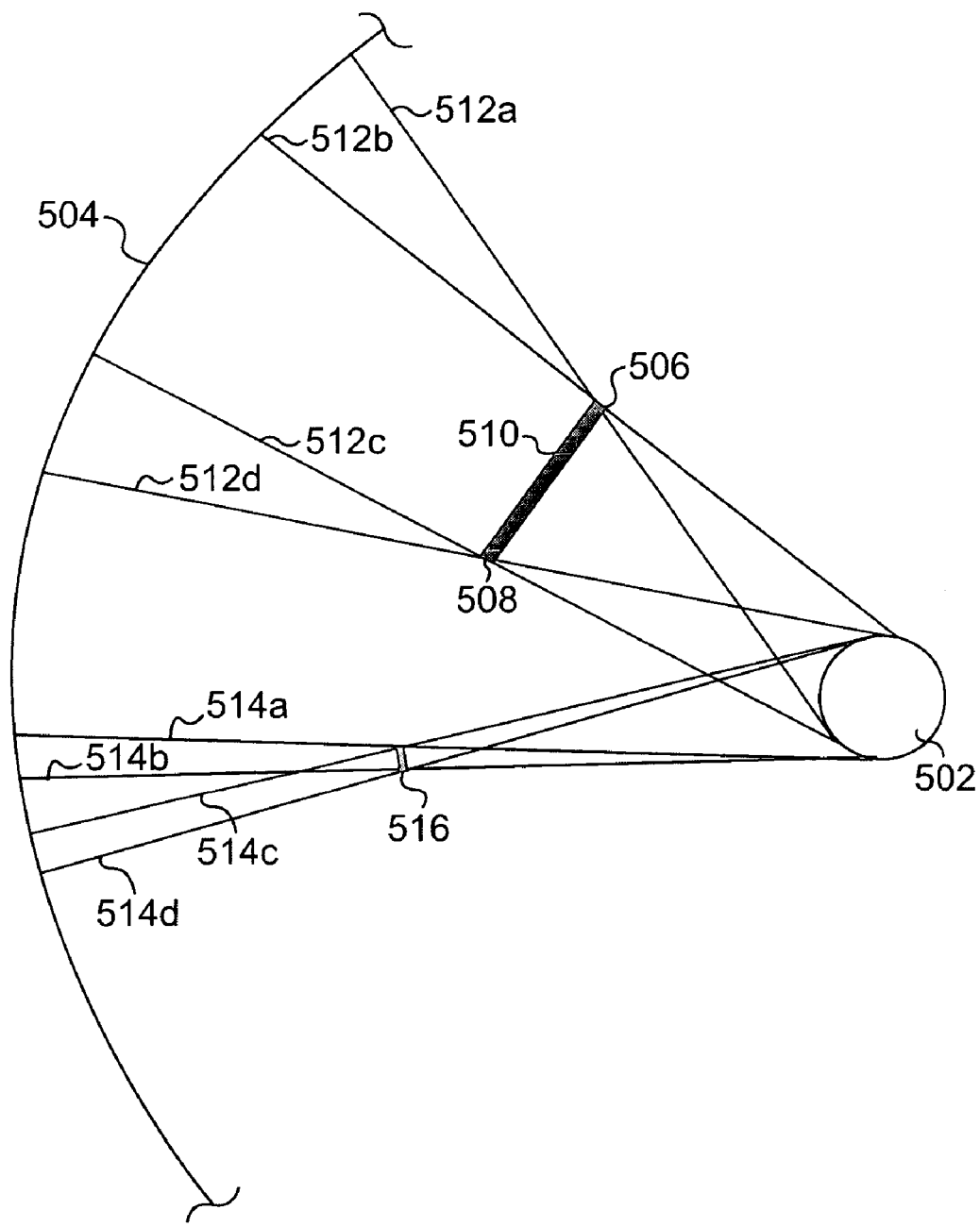
FIG. 5 is a diagrammatic illustration of minimizing cord lengths between datum curves of the model of FIG. 4.

For clarification purposes only and with reference to FIG. 5, a sight path is shown in two-dimensions from an origin 502 to a horizon 504. First and second points 506 and 508 may be established at end points of first obstruction 510 disposed between origin 502 and horizon 504. Sight lines 512*a-d* (similar to datum curves 422*a-d*) may be generated tangent to origin 502, through points 506, 508, and extended to horizon 504. Sight paths 512*b* and 512*c* establish the minimum area along horizon 504 (the portion of horizon 504 between sight lines 512*b* and 512*c*) that may be blocked by first obstruction 510. Similarly, sight paths 514*a-d* may be generated with respect to second obstruction 516. Sight paths 514*a-d* overlap along horizon 504 and as such, establish that no area along horizon 504 is blocked by second obstruction 516. It is noted that in two-dimensions, only two lines can be generated tangent to origin 502, through a point, and extended to perimeter 504. It is contemplated that in three-dimensions, a plurality of lines can be generated tangent to predetermined location 404, through a datum point, and extended to virtual perimeter 408.

Referring back to FIG. 4, program 204 may be further configured to construct sectors 424*a-b* along virtual perimeter 404 between adjacent datum curves 422*a-b* and 422*c-d*, respectively. It is contemplated that sectors 424*a-b* may approximate unviewable sections 30*a-b* (referring to FIG. 1) of work machine 10. Furthermore, program 204 may be configured to generate in virtual space 206 and/or display in GUI 208 chords 426*a-b*. Chords 426*a-b* may be disposed across sectors 424*a-b*.

Step 310 (FIG. 3) may include determining whether characteristics such as, for example, number, size, length, and/or other characteristics of interferences 406*a-b* are within a predetermined acceptable range of characteristics. Specifically, program 204 may be configured to determine the respective length of chords 426*a-b* of sectors 424*a-b* by a sub-routine and/or algorithm, such as, for example, using the three-dimensional coordinates of two endpoints (e.g., the intersection points between datum curves 422*a-b* and virtual perimeter 408). The lengths of chords 426*a-b* may be displayed in GUI 208 and/or outputted to computer 202 for comparison by user 210 with predetermined acceptable ranges of chord lengths. It is contemplated that program 204 may, alternatively, compare the length of chords 426*a-b* with predetermined acceptable ranges within a sub-routine and/or algorithm and display in GUI 208 and/or output to computer 202 a summary of the analysis for interpretation by user 210.

Step 310 may also include determining the number of interferences 406*a-b* along virtual perimeter 408. Program 204 may be configured to identify the number of chords 426*a-b* and display the number in GUI 208 and/or output the number to computer 202. It is contemplated that program 204 may, alternatively, compare the determined number of chords 426*a-b* with a predetermined acceptable number of chords within a sub-routine and/or algorithm. It is also contemplated that user 210 may determine the number of chords 426*a-b* via GUI 208 and compare the number with a predetermined acceptable number. It is further contemplated that the number of interferences 406*a-b* may be determined by any known identifying method, such as, for example, determining the number of generated sectors 424*a-b* and/or another method.

Step 312 may include user 210 redesigning modeled object 400 based in part on interferences 406a-b and the predetermined acceptable ranges for interferences. Specifically, user 210 may change, alter, and/or amend modeled object 400 to reduce the number and/or the size of interferences 406a-b. Method 300 may be repeated to evaluate the effects of the redesign on interferences 406a-b. It is contemplated that user 210 may additionally redesign modeled object 400 based in part on other design considerations, such as, for example, structural integrity and/or operator ergonomics which may affect the degree and/or number of interferences 406a-b.

INDUSTRIAL APPLICABILITY

The disclosed method and apparatus for determining virtual visibility may be applicable to approximately determine any sight path relative to an object. The disclosed method and apparatus may provide more accurate modeling of objects, increased ease of determining interferences, and greater flexibility for modeling objects and sight paths. The operation of design environment 200 and, more particularly, method 300 is explained below.

During the design of new objects and/or during the evaluation of existing objects, competing interests may affect the overall design. For example, safety of an operator may compete with visibility of an operator to a perimeter, visibility of an operator may compete with structural integrity of an operator station, all of which may compete with operator ergonomics. Accordingly, objects may be virtually designed to evaluate and compare various designs thereof.

Operator visibility and its effect on the safety of the operator, the object, and/or other persons and objects around the object are becoming increasingly important to designers. Design environment 200 (FIG. 2) and, in particular, method 300 (FIG. 3) may enable user 210 to approximate and evaluate operator visibility. The discussion below is made in reference to work machine 10 and modeled object 400 for clarification purposes only. It is noted that the disclosed method and apparatus may be applicable to any object and/or any modeled object.

Referring to FIGS. 2 and 4, user 210 may deliver inputs to computer 202 to communicate with program 204 to generate modeled object 400 approximating work machine 10 within virtual space 206. Modeled object 400 may be displayed in GUI 208 throughout all stages of modeling. Specifically, as user 210, via program 204, generates portions of modeled object 400, such portions may be displayed in GUI effectively showing partial views of modeled object 400. User 210 may generate modeled object 400 according to known three-dimensional solid modeling techniques, such as, for example, generating points in virtual space 206, connecting points to form lines, connecting lines to form surfaces, and connecting surfaces to form volumes. It is contemplated that user 210 may generate modeled object 400 to approximate only the outer dimensions of work machine 10 and may not fully model all of the potential components of work machine 10. It is further contemplated that user 210 may omit from modeled object 400, those portions of work machine 10 known by user 210 to not interfere with sight path 20.

User 210 may also deliver inputs to computer 202 to communicate with program 204 to generate virtual surface 402 approximating sight path 20. Virtual surface 402 may be displayed in GUI 208 throughout all stages of modeling. User 210 may command program 204 to generate virtual surface 402 from predetermined location 404 to virtual perimeter 408. Specifically, user 210 may generate virtual visibility surface 402 by modeling a first circle at a location approximating an operator's eyes, modeling a second circle at a predetermined radius approximating an operator's sight perimeter, and generating a surface therebetween. Additionally, predetermined location 404 may be positioned at any location relative to modeled object 400 to approximate different operators, and/or different sight paths 20. Similarly, virtual perimeter 408 may be positioned at any location and/or at any radius relative to modeled object 400 to approximate different visibility horizons. As such, virtual visibility surface 402 may be generated relative to modeled object 400 to approximate any sight path.

User 210 may subsequently command program 204 to determine whether any interferences 406a-b exist between modeled object 400 and virtual visibility surface 402. User 210 may command program 204 to run a sub-routine designed to automatically determine any interferences 406a-b and/or user 210 may visually inspect the displayed modeled object 400 and virtual surface 402 in GUI 208 to manually inspect and determine interferences 406a-b. For example, user 210 may, via program 204, compare two points, lines, surfaces, and/or volumes to determine if the two entities intersect. It is contemplated that program 204 may additionally include a sub-routine configured to determine intersecting entities within virtual space 206 as is known in the art.

Similarly, user 210 may also command program 204 to generate datum points at intersections 420a-d of modeled object 400 and virtual visibility surface 402. User 210 may further command program 204 to plot datum curves 422a-d through the generated datum points to virtual perimeter 408 and tangent to predetermined location 404. Datum curves 422a-d may be generated to minimize the degree of unviewable area along virtual perimeter 408. It is contemplated that user 210 may generate one or more datum curves through a first datum point (e.g., at intersection 420a), generate one or more datum curves through a second datum point (e.g., at intersection 420b), and select two datum curves, one through the first datum point and one through the second datum point (e.g., datum curves 422a-b), that establish a minimum unviewable area along perimeter 408. It is also contemplated that program 204 may, alternatively, be configured to automatically generate datum curves 422a-d by, for example, a sub-routine, an algorithm, and/or other computer routine. It is further contemplated that user 210 may command program 204 to run sub-routines designed to automatically generate the datum points and plot datum curves 422a-d and/or user 210 may visually inspect the displayed modeled object 400 and virtual visibility surface 402 in GUI 208 and manually generate the datum points and datum curves 422a-d as is known in the art.

Finally, user 210 may command program 204 to generate chords 426a-b between adjacent intersection points between datum curves 422a-d and virtual perimeter 408. Chords 426a-b may be compared to predetermined ranges of acceptable chords to approximately determine the degree of unviewable sectors along perimeter 24. It is contemplated that the number of unviewable sectors, the length of individual chords, and/or other characteristics indicative of the degree of unviewable sectors may be determined as desired.

User 210 may subsequently evaluate interferences 406a-b and the unviewable areas determined in design environment 200 with method 300 and may redesign work machine 10 to adjust the location, the number, the chord length, and/or any other characteristic of the unviewable areas to achieve a desired operator visibility. It is contemplated that a plurality of iterations may be performed by user 210 until a desired design of work machine 10 is achieved. It is further contemplated that additional iterations may be necessary subsequent to the evaluation of other structural aspects of work machine 10, such as, for example, structural integrity, visibility determinations from different perspectives, operator ergonomics, and/or other design considerations.

Because an object and visibility surface may be modeled in virtual space 206, a virtual visibility may be determined from a given perspective. Interferences within an operator's sight path may be determined during the design stage of an object and changes may be made to the design of the object before building a prototype and/or before investing significant resources on the object. Also, evaluating virtual visibility may be less cumbersome than evaluating actual visibility on a full and/or partial scale model of an object. Additionally, the visibility of an existing object can be evaluated for benchmarking, case study, and/or other informational purposes that may enable a designer to improve the design of subsequent objects.

Additionally, because the determined unviewable areas may be minimized, the virtual visibility may account for the ability of an operator to move and adjust a line of sight. Specifically, because a sight path normally originates from two locations (e.g., two eyes of an operator) and because several sight paths may be available (e.g., a moving head of an operator), the accuracy of the virtual visibility may be improved to closely approximate actual visibility.

Furthermore, because the object and visibility surface are modeled within the same virtual space, the modeled geometries may more closely approximate actual dimensions than models that import geometries. Accordingly, an accurate virtual visibility may be determined during design of an object and may allow a user to evaluate operator visibility. As such, the cost of designing an object may be reduced, the safety of an object may be increased, the complexity of determining interferences may be reduced, and/or the ergonomics of an object may be improved.

It will be apparent to those skilled in the art that various modifications and variations can be made to the disclosed method and apparatus for determining virtual visibility. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. A method for determining interferences within a sight path of a vehicle operator comprising:
    executing a computer executable program stored within a memory of a computer to perform the following:
    modeling at least one object that represents a vehicle in a virtual space and plotting at least one surface from a first predetermined location to a perimeter relative to the at least one object within the virtual space;
    identifying a first and second intersections between the at least one object and the at least one surface;
    projecting a first and second datum curve through the first and the second identified intersections, the first and second datum curves being tangent to the first predetermined location and defining a first minimum chord along the perimeter therebetween;
    identifying at least one interference between the at least one object and the at least one surface based on the first minimum chord;
    determining a first characteristic of the at least one interference; and
    determining if the first characteristic is within a predetermined range.

2. The method of claim 1, including executing the computer executable program to further perform:
    re-modeling at least a portion of the at least one object within the virtual space and plotting at least a second surface from a second predetermined location to the perimeter relative to the at least one object;
    identifying a third and fourth intersection between the at least one object and the at least one surface;
    projecting a third and fourth datum curve respectively through the third and fourth identified intersections, the third and fourth datum curves being tangent to the second predetermined location and defining a second minimum chord along the perimeter therebetween; and
    identifying at least one second interference between the at least one object and the second surface based on the second minimum chord.

3. The method of claim 1, wherein the first characteristic is indicative of the number of determined interferences.

4. The method of claim 1, including executing the computer executable program to further perform:
    identifying a sector along the perimeter affected by the at least one interference.

5. The method of claim 1, wherein the first characteristic is indicative of the length of the first minimum chord.

6. The method of claim 1, including executing the computer executable program to further perform:
    identifying a plurality of intersections between the at least one object and the at least one surface;
    generating a plurality of datum points, each datum point being disposed at an indentified intersection; and
    projecting the first datum curve through at least one datum point to the perimeter, the first datum curve being tangent to the first predetermined location.

7. The method of claim 6, including executing the computer executable program to further perform:
    projecting the second datum curve through another datum point to the perimeter.

8. The method of claim 1, wherein the projecting the first and second datum curves includes overlapping the first and second datum curves.

9. The method of claim 1, wherein the at least one object is a machine and the first predetermined location is disposed within an operator station of the machine.

10. A design environment for evaluating a sight path of a vehicle operator comprising:
    a computer;
    a virtual space; and
    a computer executable program configured to:
    model an object that represents a vehicle at least partially based on user inputs within the virtual space,
    project a surface through the model within the virtual space from a first predetermined location to a perimeter, and
    identify in the virtual space first and second intersections between the model and the surface, and
    project first and second datum curves respectively through the first and second identified intersections, the first and second datum curves being tangent to the first predetermined location and defining a minimum chord along the perimeter therebetween, and
    identify at least one interference between the object and the surface based on the minimum chord,
    determine a first characteristic of the at least one interference, and
    determine if the first characteristic is within a predetermined range.

11. The design tool of claim 10, further including a graphical user interface configured to display the model as a virtual three-dimensional model.

12. The design tool of claim 10, further including the computer executable program configured to remodel at least part of the object, the remodeling being at least partially based on user inputs.

13. The design tool of claim 10, wherein the computer executable program is further configured to:
   identify datum points within the virtual space at the first and second intersections, and
   project the first and second datum curves within the virtual space through one of the plurality of datum points.

14. The design tool of claim 13, wherein the computer executable program is configured to determine chord lengths along the perimeter between the first and second datum curves.

15. A method of determining visibility of a sight path of a vehicle operator, comprising:
   executing a computer executable program stored within a memory of a computer to perform the following:
   generating a model within a virtual three-dimensional space, the model being indicative of a first object that represents a vehicle;
   generating a surface from a first predetermined location to a perimeter within the virtual three-dimensional space, the surface being indicative of a sight path from a given perspective;
   identifying first and second intersections between the first object and the surface;
   projecting a first and second datum curve respectively through the first and second identified intersections, the first and second datum curves being tangent to the first predetermined location and defining a first minimum chord along the perimeter therebetween;
   approximating a first portion along the perimeter unviewable from the given perspective relative to the first object at least partially based on the first minimum chord;
   identifying at least one interference between the first object and the surface based on the first minimum chord;
   determining a first characteristic of the at least one interference; and
   determining if the first characteristic is within a predetermined range.

16. The method of claim 15, including executing the computer executable program to further perform:
   generating a second model within the virtual three-dimensional space, the model being indicative of a second object;
   generating a second surface from a second predetermined location to the perimeter within the virtual three-dimensional space, the second model being indicative of a second sight path from a second given perspective;
   projecting a third and fourth datum curve respectively through the third and fourth identified intersections, the third and fourth datum curves being tangent to the second predetermined location and defining a second minimum chord along the perimeter therebetween; and
   approximating a second portion along the perimeter unviewable from the second given perspective relative to the second object at least partially based on the second minimum chord.

17. The method of claim 15, further including executing the computer executable program to further perform:
   approximating the first and second chord lengths of the first and second portions along the first perimeter.

18. The method of claim 17, further including executing the computer executable program to further perform:
   comparing the approximated chord lengths with a predetermined range of acceptable chord lengths.

19. The method of claim 15, wherein the first and second intersections are two of a plurality of intersections identified between the at least one object and the at least one surface, and the first and second datum curves are a first pair of datum curves, the method further including executing the computer executable program to further perform:
   projecting at least one additional pair of datum curves respectively through two additionally identified intersections, the second pair of datum curves being tangent to the first predetermined location and defining a respective minimum chord along the perimeter therebetween; and
   identifying at least one second interference between the at least one object and the at least one surface for each pair of datum curves.

20. The method of claim 19, wherein the first characteristic is indicative of the number of determined interferences.

* * * * *